United States Patent [19]

Williams

[11] Patent Number: 5,449,956
[45] Date of Patent: Sep. 12, 1995

[54] DUAL PEDAL OPERATION OF ELECTRONICALLY-CONTROLLED VEHICLE ENGINE

[75] Inventor: Edward L. Williams, Fort Wayne, Ind.

[73] Assignee: Navistar International Transportation Corp., Chicago, Ill.

[21] Appl. No.: 191,379

[22] Filed: Feb. 2, 1994

[51] Int. Cl.⁶ ............................................. B62D 1/22
[52] U.S. Cl. .................... 307/10.1; 73/118.1; 123/396; 123/399; 30/322; 30/335
[58] Field of Search ................. 307/9.1, 10.1, 120, 307/121; 180/335, 321–323; 123/396, 399; 74/513; 340/441, 467, 466; 324/160, 161, 162; 73/118.1

[56] References Cited

U.S. PATENT DOCUMENTS

| | | | |
|---|---|---|---|
| 2,791,915 | 5/1957 | Merry | 180/322 |
| 2,890,597 | 6/1959 | Allgaier | 180/322 |
| 3,313,110 | 4/1967 | Rohr | 180/322 |
| 4,921,066 | 5/1990 | Conley | 180/322 |
| 5,133,321 | 7/1992 | Hering et al. | 123/399 |
| 5,150,681 | 9/1992 | Kull et al. | 123/399 |
| 5,280,282 | 1/1994 | Nagafusa et al. | 180/321 |
| 5,309,759 | 5/1994 | Marshall | 73/118.1 |
| 5,321,980 | 6/1994 | Hering et al. | 73/118.1 |

Primary Examiner—William M. Shoop, Jr.
Assistant Examiner—Richard T. Elms
Attorney, Agent, or Firm—Dennis K. Sullivan

[57] ABSTRACT

An automotive vehicle that is powered by an electronically-controlled engine, such as a truck that is powered by an electronically-controlled diesel engine, is equipped with dual sets of controls, one set on each side of the vehicle. The accelerator pedal of each set operates a corresponding accelerator pedal sensor, and the two accelerator pedal sensors are coupled with an electronic controller of the engine by a coupling circuit that includes diodes for blocking current flow from each sensor to the other so that neither sensor can impose a load on the other that would impair the accuracy of the pedal position signal from the one sensor that is actively connected to the controller to the exclusion of the other because that one sensor's pedal is more distant from idle that the other pedal.

9 Claims, 2 Drawing Sheets

DUAL PEDAL OPERATION OF ELECTRONICALLY-CONTROLLED VEHICLE ENGINE

FIELD OF THE INVENTION

This invention relates to vehicles that are powered by an electronically-controlled engine and that have driver stations on both right and left sides.

BACKGROUND AND SUMMARY OF THE INVENTION

Vehicles that have dual driver controls are used in various industries, such as the recycling industry. For example, a truck that collects recyclable materials from residential areas is often operated by a single person who must both drive the vehicle from stop to stop and also get out at each stop to load the curbside collection into collection bins on the vehicle. Since curbside collections may take place on either or both the right and left sides of a street depending on the nature of the neighborhood bordering the street and on the direction of travel of a recycling truck along the street, a vehicle that has both right- and left-side driver stations each equipped with its own set of driver controls should enable a single person to perform this collection service with greater overall efficiently than if the vehicle had only a single driver station on one particular side.

Such dual-control vehicles which have engines that are operated strictly by mechanical controls typically employ respective mechanical linkages linking their respective driver controls to the engine. Thus for example, dual accelerator pedals are mechanically linked together to the engine so that either pedal by itself is capable of accelerating the engine. In a vehicle having an electronically-controlled engine, the accelerator pedal does not act directly on the engine, but instead acts on an accelerator pedal sensor that provides an input to an electronic controller that in turn accelerates the engine based on the accelerator pedal sensor input. The electronic controller may also at times take into account certain inputs from other sources as it accelerates the engine.

While it may be possible to link dual accelerator pedals together so that either one is capable of operating a single accelerator pedal sensor, the present invention provides a better solution to the problem of equipping an electronically-controlled engine with dual accelerator pedal controls because it employs existing accelerator pedal sensors that are currently used in single accelerator pedal control of an electronically-controlled engine.

A typical existing accelerator pedal sensor comprises a housing that contains a pedal position sensing device and an idle validation switch that are operated by a mechanical input from an accelerator pedal that is external to the housing. This mechanical input is typically a crank or lever, and the pedal position sensing device is typically a potentiometer. The wiper of the potentiometer is mechanically operated by the pedal, and it is electrically coupled to the electronic controller so that the potentiometer supplies to the controller a voltage whose magnitude represents pedal position over a range spanning idle and non-idle positions. The idle validation switch serves to distinguish idle position from non-idle positions, and it is coupled with the electronic controller so that the controller can detect whether the switch is in open or closed condition. One switch condition indicates that the pedal is in idle position while the other switch condition indicates that the pedal is in non-idle position.

The invention comprises the use of two such accelerator pedal sensors like the one just described, one sensor for each pedal, and a coupling circuit means, including a diode network, for coupling the two sensors with the electronic controller. The diode network serves two purposes: 1) to assure that the sensor whose accelerator pedal is more distant from idle is actively connected to the controller to the exclusion of the other sensor, and 2) to assure that the other sensor imposes no current drain on the actively connected sensor that might otherwise impair the accuracy of the input that the actively-connected sensor is furnishing to the controller. The diodes can be incorporated into the wiring harness that couples the sensors with the controller so that neither the controller nor the sensors has to be modified for a dual-control configuration.

The foregoing, along with further features, advantages, and benefits of the invention, will appear in and from the following detailed description of a presently preferred embodiment representing the best mode contemplated at this time for carrying out the invention.

DESCRIPTION OF THE PREFERRED EMBODIMENT

Figure 1:
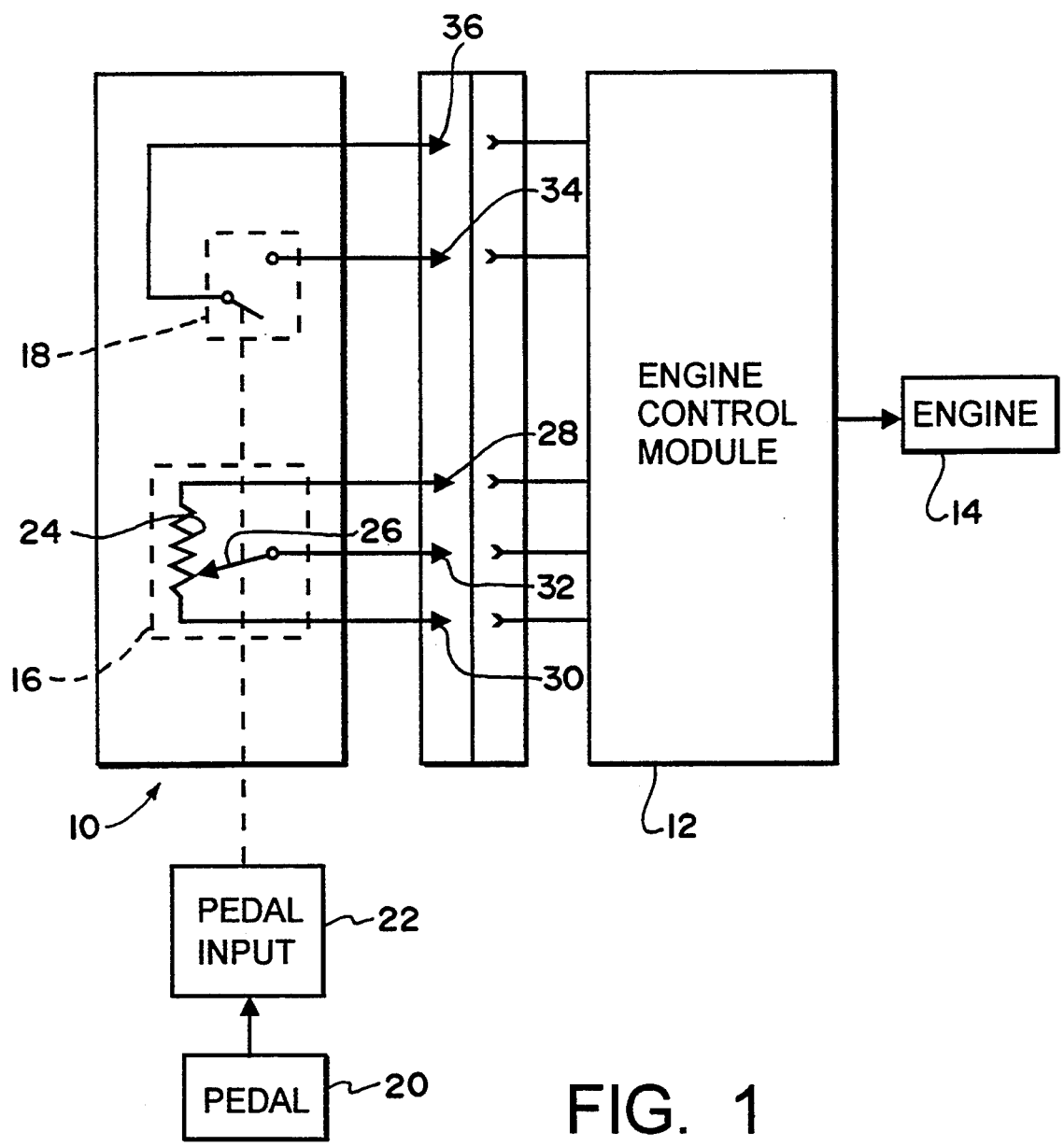
FIG. 1 is a general schematic diagram of an accelerator pedal sensor in association with an engine control in a known single-control configuration where the vehicle has only a single control.

FIG. 1 shows an accelerator pedal sensor 10 operatively connected to an electronic control module (ECM) 12 that controls an engine 14 that powers the vehicle. ECM 12 receives a number of other inputs (not shown) which, in conjunction with input from sensor 10, control the acceleration of engine 14, and hence the speed of the vehicle. Pedal sensor 10 comprises an accelerator pedal position sensing device, or transducer, 16 and an idle validation switch (IVS) 18. The movements of both position sensing device 16 and IVS 18 are mechanically linked with the vehicle's accelerator pedal 20 by a pedal input 22. Position sensing device 16 is a potentiometer comprising resistance 24 and a wiper, or tap, 26 that is positioned along resistance 24 by pedal input 22 in accordance with the position of pedal 20. Resistance 24 is connected between terminals 28 and 30 while tap 26 is connected to a third terminal 32. Switch 18 is connected between fourth and fifth terminals 34 and 36. It is operated by pedal input 22 to distinguish idle position of pedal 20 from non-idle positions by being operated open when the pedal is in idle and closed when the pedal is in non-idle. Terminals 28, 30, 32, 34, and 36 are connected by means of wiring harness with ECM 12. FIG. 1 illustrates idle position.

A fixed DC voltage (from ECM 12 in this design) is applied across resistance 24, and a selected fraction of that voltage is picked by wiper 26 and delivered back as an input to ECM 12 that is representative of pedal position. In the illustrated embodiment, this input to ECM 12 is an increasing fraction (referenced to ground) as pedal 20 moves increasingly away from idle position. Accordingly, sensing device 16 supplies to ECM 12 a voltage whose magnitude represents accelerator pedal position over a range spanning idle and non-idle positions of the pedal.

The purpose of IVS 18 is to validate idle position by switching from one condition to the other proximate the released position of pedal 20 which is the position assumed when the pedal is not being depressed by the driver. This released position corresponds to "closed, or substantially closed, throttle" at which the engine essentially idles. There is typically a small tolerance that allows the actual switch point of IVS 18 to occur at or within a few percent of the released position of the pedal, and hence it should be understood that reference to idle position of sensor 10 may comprise a small range of positions proximate the released position of the pedal.

Figure 2:
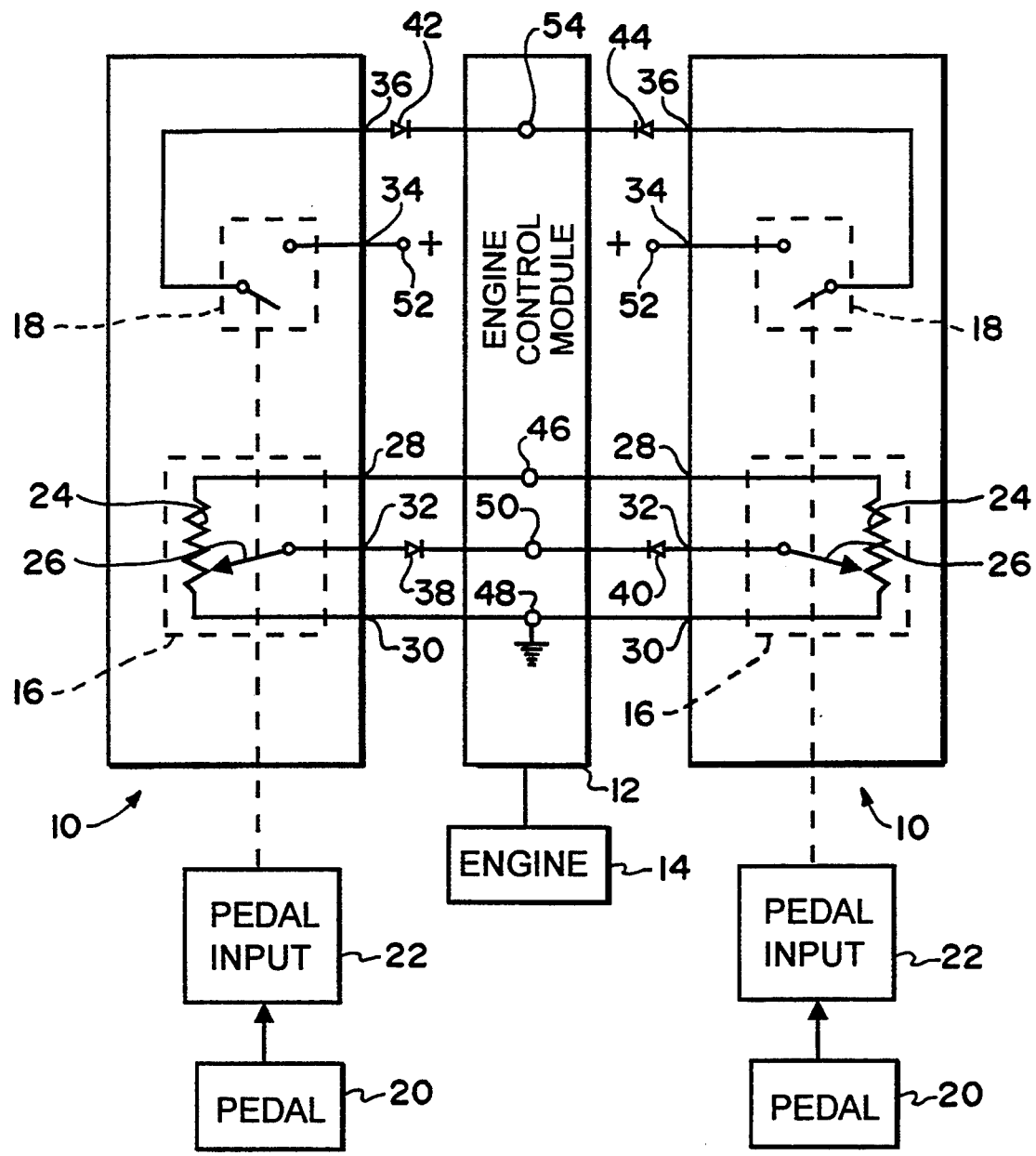
FIG. 2 is a schematic diagram of a dual-control configuration embodying principles of the invention.

In order to provide a vehicle having an electronically-controlled engine with dual controls, the invention does not contemplate mechanically linking dual accelerator pedals 20 as mechanical inputs to a single sensor 10. Rather the invention contemplates an electrical coupling of two such sensors 10, as illustrated by FIG. 2 which shows right and left driver stations of a vehicle each equipped with a respective sensor 10, a respective accelerator pedal 20 and a respective mechanical input 22 linking each pedal 20 with its sensor 10. Sensors 10 are coupled with ECM 12 by an electric circuit coupling that includes four diodes 38, 40, 42, and 44.

ECM 12 delivers a given D.C. voltage via its terminals 46 and 48 across each resistance 24. The wiper 26 of one sensing device 16 is coupled through one diode 38 to a third terminal 50 of ECM 12. The wiper 26 of the other sensing device 16 is coupled through another diode 40 to terminal 50. A hot terminal 52 of the vehicle's electrical system is connected to one of the two terminals of each IVS 18, terminal 34 in this instance, while each of the other IVS terminals 36 is coupled through a respective diode 42, 44 to a fourth terminal 54 of ECM 12. Terminal 52 is at positive D.C. voltage potential referenced to ground, as is terminal 46, although the latter is at a different potential from the former in the specific embodiment illustrated. Terminal 48 is referenced to ground.

In idle position of both pedals, the electrical potential at terminal 52 is not coupled through to ECM terminal 50 because both IVS's 18 are open. When either pedal is operated to non-idle, its IVS 18 closes to cause the potential at terminal 52 to be coupled through to ECM terminal 54 because the corresponding diode 42, 44 is forward biased. If only one of the IVS's 18 closes, the other diode 42, 44 will be effective to electrically isolate the open IVS from the closed IVS. Should both pedals be simultaneously operated to non-idle positions, both diodes are forward biased to couple the potential from terminal 52 through to terminal 54.

In idle position of both pedals, neither diode 38, 40 is forward biased, and so no potential is coupled through to ECM terminal 50. When either pedal is operated to non-idle, the sensing device 16 whose pedal is more distant from idle position is actively connected to terminal 50. In such a case, the wiper of the actively connected sensing device 16 is at a higher potential that the other wiper, and so the particular diode 38, 40 through which it is connected to terminal 50 is forward biased while the other diode 38, 40 is reverse biased. Thus the pedal position signal that is given to ECM 12 is that from the sensing device 16 of the sensor 10 whose pedal 20 is more distant from idle than the other. Because the diode 38, 40 of the other sensor is reverse biased, it blocks any current flow from the actively connected sensing device 16 to the other sensing device 16, thereby preventing the other sensing device from being a current drain that would otherwise draw additional current through the resistance of the actively connected sensing device and cause the voltage that is delivered to terminal 50 to be of less positive magnitude that it otherwise would be. In other words, the sensing device 16 whose pedal is less distant from idle position is prevented from impairing the accuracy of the pedal position signal to ECM 12 from the actively-connected sensing device 16. Should both pedals 20 be in identical non-idle positions in which their wipers 26 are at the same potential, that potential is delivered through to ECM 12.

It should be appreciated that while actual solid state diodes approximate an ideal on-off characteristic without voltage drop, they nevertheless do have a voltage drop when conductive; but this voltage drop is however small in comparison to the system voltages, and its effect in an actual system can be considered of no consequence. The use of in-line solid state diodes allows them to be incorporated into wiring harness coupling the sensors with the ECM, thereby precluding the necessity of having unique sensors for dual-control vehicles.

While a presently preferred embodiment of the invention has been illustrated and described, it should be appreciated that principles of the invention are applicable to all embodiments that fall within the scope of the following claims.

What is claimed is:

1. In an automotive vehicle comprising an engine that powers the vehicle and that is under the control of an electrical controller that is itself under the control of two separate accelerator pedals in different locations of the vehicle for operating the engine over a range comprising idle operation and non-idle operation, the improvement which comprises:
   a) for each accelerator pedal, a corresponding accelerator pedal sensor that is individual to and operated by the corresponding pedal;
   b) each said sensor comprising,
      i) an accelerator pedal position sensing device for providing an electrical pedal position signal representing position of the corresponding pedal over a pedal range spanning an idle position and non-idle positions, and
      ii) an idle validation switch for providing a validation signal to distinguish idle position from non-idle positions of the corresponding pedal;
   c) each said sensing device comprising means operated by the corresponding pedal for providing a corresponding electrical pedal position signal as a voltage whose magnitude represents pedal position over such pedal range;
   d) each idle validation switch comprising switch means operated by the corresponding pedal selectively to first and second switch conditions for distinguishing idle position of the pedal from non-idle positions of the pedal by presenting one of said switch conditions when the pedal is in idle position and the other of said switch conditions when the pedal is in non-idle; and
   e) coupling circuit means for operatively coupling said sensors with said controller such that
      i) whenever the pedals are in identical positions in which their respective sensing devices provide identical magnitude voltages, such identical magnitude voltage is coupled through to said controller, ii) whenever the pedals are in different positions in which their respective sensing devices provide different magnitude voltages, only the voltage from the one sensing device whose pedal is more distant from idle position is coupled through to said controller to the exclusion of the voltage from the other sensing device, iii) whenever at least one pedal is in non-idle position causing the corresponding idle validation switch to be in said other switch condition, such other switch condition is coupled through to said controller to the exclusion of said one switch condition, and iv) whenever both pedals are in idle position causing both idle validation switches to be in said one switch condition, such one switch condition is coupled through to said controller; and f) said coupling circuit means including current blocking means comprising, i) means for blocking current flow between each sensing device when voltage from the one sensing device whose pedal is more distant from idle position is coupled through to said controller so as to thereby prevent the other sensing device from imposing a current drain on such one sensing device that would otherwise impair the accuracy of the voltage coupled through to said controller from such one sensing device.

2. The improvement set forth in claim 1 in which said current blocking means further includes diode means for blocking current flow from each idle validation switch to the other idle validation switch when both pedals are in non-idle positions.

3. The improvement set forth in claim 1 in which said vehicle has a right-side driver station on the right side of the vehicle and a left-side driver station on the left side of the vehicle, and said two pedals are located respectively at said right- and left-side driver stations.

4. The improvement set forth in claim 1 in which each said means operated by the corresponding pedal for providing a corresponding electrical pedal position signal as a voltage whose magnitude represents pedal position over such pedal range comprises a potentiometer having a wiper that provides the corresponding electrical pedal position signal, and said means for blocking current flow between each sensing device when voltage from the one sensing device whose pedal is more distant from idle position is coupled through to said controller comprises a corresponding diode coupling the corresponding wiper with said controller.

5. The improvement set forth in claim 4 in which said current blocking means further includes diode means for blocking current flow from each idle validation switch to the other idle validation switch when both pedals are in non-idle positions, said diode means comprising a corresponding diode in series with each idle validation switch for coupling the corresponding idle validation switch with said controller.

6. In an automotive vehicle comprising an engine that powers the vehicle and that is under the control of an electrical controller that is itself under the control of two separate accelerator pedals in different locations of the vehicle for operating the engine over a range comprising idle operation and non-idle operation, the improvement which comprises:

a) for each accelerator pedal, a corresponding accelerator pedal sensor that is individual to and operated by the corresponding pedal;

b) each said sensor comprising, i) an accelerator pedal position sensing device for providing an electrical pedal position signal representing position of the corresponding pedal over a pedal range spanning an idle position and non-idle positions, and ii) an idle validation switch for providing a validation signal to distinguish idle position from non-idle positions of the corresponding pedal;

c) each said sensing device comprising, i) means that presents a certain electric circuit parameter via a first terminal means of the corresponding sensing device to which a given voltage is applied, and ii) selection means operated by the corresponding pedal for providing, via a second terminal means of the corresponding sensing device, a corresponding electrical pedal position signal as a fraction of said given voltage that is determined by the position of the corresponding pedal position over such pedal range;

d) each idle validation switch comprising switch means operated by the corresponding pedal selectively to first and second switch conditions for distinguishing idle position of the pedal from non-idle positions of the pedal by presenting one of said switch conditions when the pedal is in idle position and the other of said switch conditions when the pedal is in non-idle; and e) coupling circuit means for operatively coupling said sensors with said controller, including diode means for coupling said second terminal means of both sensing devices with said controller, such that i) whenever the pedals are in identical positions in which their respective sensing devices provide identical fractions of said given voltage, such identical fraction of said given voltage is coupled through to said controller, ii) whenever the pedals are in different positions in which their respective sensing devices provide different fractions of said given voltage, only the fraction of said given voltage from the one sensing device whose pedal is more distant from idle position is coupled through to said controller to the exclusion of the fraction of said given voltage from the other sensing device, iii) whenever at least one pedal is in non-idle position causing the corresponding idle validation switch to be in said other switch condition, such other switch condition is coupled through to said controller to the exclusion of said one switch condition, and iv) whenever both pedals are in idle position causing both idle validation switches to be in said one switch condition, such one switch condition is coupled through to said controller; and f) said diode means comprising, i) means for blocking current flow between each sensing device such that neither can impose a current drain on the other that would otherwise impair the accuracy of the fraction of said given voltage that is coupled through to said controller from the one sensing device whose pedal is more distant from idle position.

7. The improvement set forth in claim 6 in which said coupling circuit means further includes further diode means for blocking current flow from each idle validation switch to the other idle validation switch when both pedals are in non-idle positions, said further diode means comprising a corresponding diode in series with each idle validation switch for coupling the corresponding idle validation switch with said controller.

8. The improvement set forth in claim 6 in which each said means that presents a certain electric circuit parameter via a first terminal means of the corresponding sensing device to which a given voltage is applied comprises a resistance, and the corresponding selection means operated by the corresponding pedal for providing, via a second terminal means of the corresponding sensing device, a corresponding electrical pedal position signal as a fraction of said given voltage that is determined by the position of the corresponding pedal over such pedal range comprises a wiper that travels along the corresponding resistance; and said means for blocking current flow between each sensing device when voltage from the one sensing device whose pedal is more distant from idle position is coupled through to said controller comprises a corresponding diode coupling the corresponding wiper with said controller.

9. The improvement set forth in claim 6 in which said vehicle has a right-side driver station on the right side of the vehicle and a left-side driver station on the left side of the vehicle, and said two pedals are located respectively at said right- and left-side driver stations.

* * * * *